Figure 1:
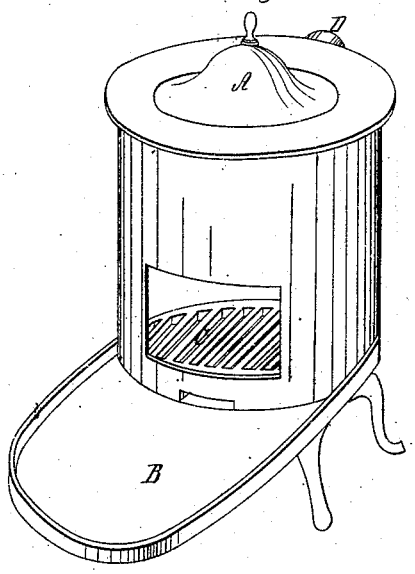
Figure 3:
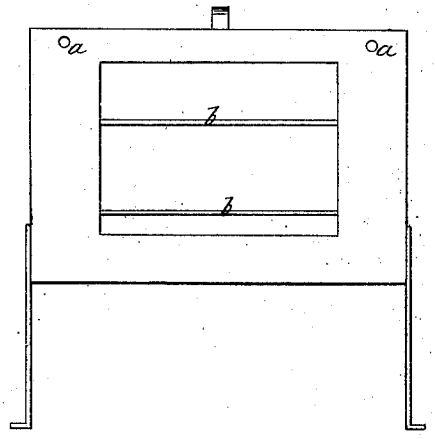
Figure 2:
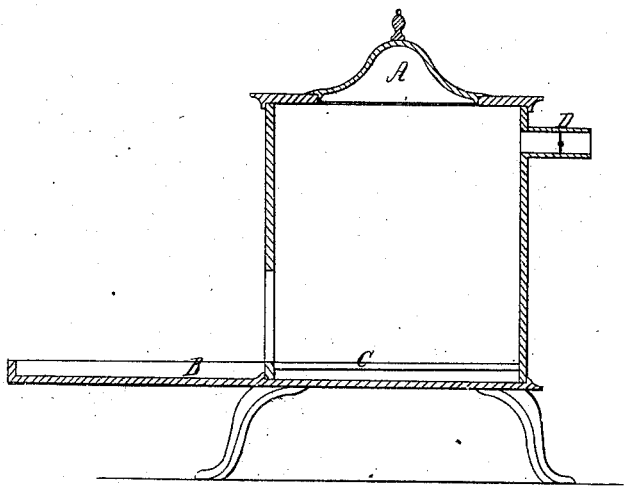
Figure 4:
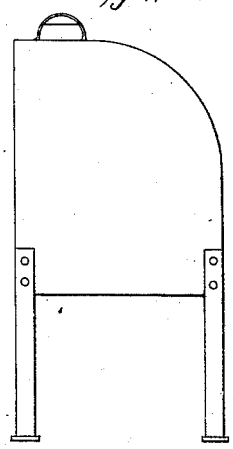

5355X

L. V. BADGER.

Furnace and Oven.

Patented Jan'y 20, 1829.

THE NORRIS PETERS CO., WASHINGTON, D. C.

United States Patent Office

PTO - BOYERS, PA Duty Station

MISSING PAGE TEMPORARY NOTICE

PATENT # 5355X FOR ISSUE DATE 1-20-1829
HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

pg 2 thru end

Data Conversion Operation

Boyers, Pa